(12) United States Patent
Shute et al.

(10) Patent No.: US 12,508,430 B2
(45) Date of Patent: Dec. 30, 2025

(54) SYSTEMS AND METHODS FOR DETECTING IMPLANTABLE DEVICE ROTATION VIA HEART SOUND MORPHOLOGY

(71) Applicant: Cardiac Pacemakers, Inc., St Paul, MN (US)

(72) Inventors: Jonathan B. Shute, Minnetonka, MN (US); Pramodsingh H. Thakur, Woodbury, MN (US); John D. Hatlestad, Maplewood, MN (US); Keith R. Maile, New Brighton, MN (US)

(73) Assignee: Cardiac Pacemakers, Inc., St Paul, MN (US)

( * ) Notice: Subject to any disclaimer, the term of this patent is extended or adjusted under 35 U.S.C. 154(b) by 437 days.

(21) Appl. No.: 18/089,150

(22) Filed: Dec. 27, 2022

(65) Prior Publication Data

US 2023/0201605 A1    Jun. 29, 2023

Related U.S. Application Data

(60) Provisional application No. 63/294,204, filed on Dec. 28, 2021.

(51) Int. Cl.
| | | |
|---|---|---|
| *A61N 1/372* | (2006.01) | |
| *A61B 5/00* | (2006.01) | |
| *A61B 7/00* | (2006.01) | |

(52) U.S. Cl.
CPC .............. *A61N 1/372* (2013.01); *A61B 5/746* (2013.01); *A61B 7/00* (2013.01); *A61B 2560/0223* (2013.01); *A61B 2562/0219* (2013.01)

(58) Field of Classification Search
CPC .. A61N 1/36542; A61N 1/36578; A61N 1/37; A61N 1/37528
See application file for complete search history.

(56) References Cited

U.S. PATENT DOCUMENTS

2020/0046982 A1*  2/2020  Min ................... A61N 1/36585
2020/0383638 A1* 12/2020  Shute ................... A61B 5/7239

\* cited by examiner

*Primary Examiner* — George R Evanisko
(74) *Attorney, Agent, or Firm* — Faegre Drinker Biddle & Reath LLP

(57) ABSTRACT

Disclosed are medical devices with an acceleration sensor configured to generate acceleration data, a processor, and a memory. The memory, which may be a non-transitory computer readable medium, contains computer-executable instructions that, when executed by the processor, causes the processor to perform the following: obtain the acceleration data from a first range of time and a second range of time different from the first range, generate heart sound data based on the acceleration data, and determine that the medical device has flipped in orientation during the second range of time by comparing the heart sound data obtained during the first range of time with the heart sound data obtained during the second range of time.

14 Claims, 7 Drawing Sheets

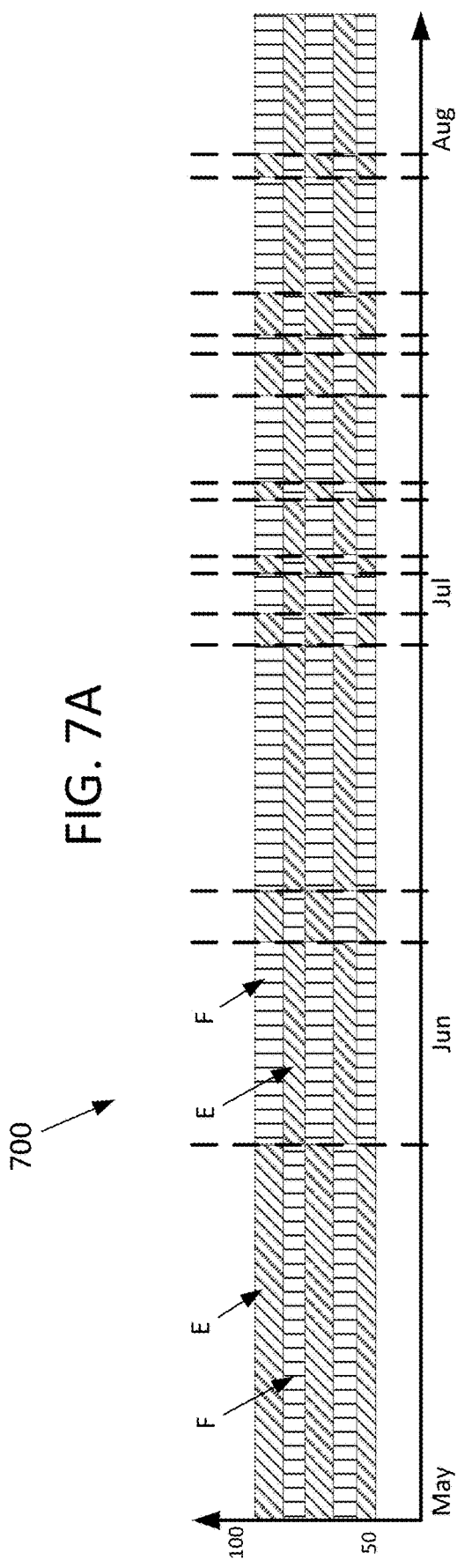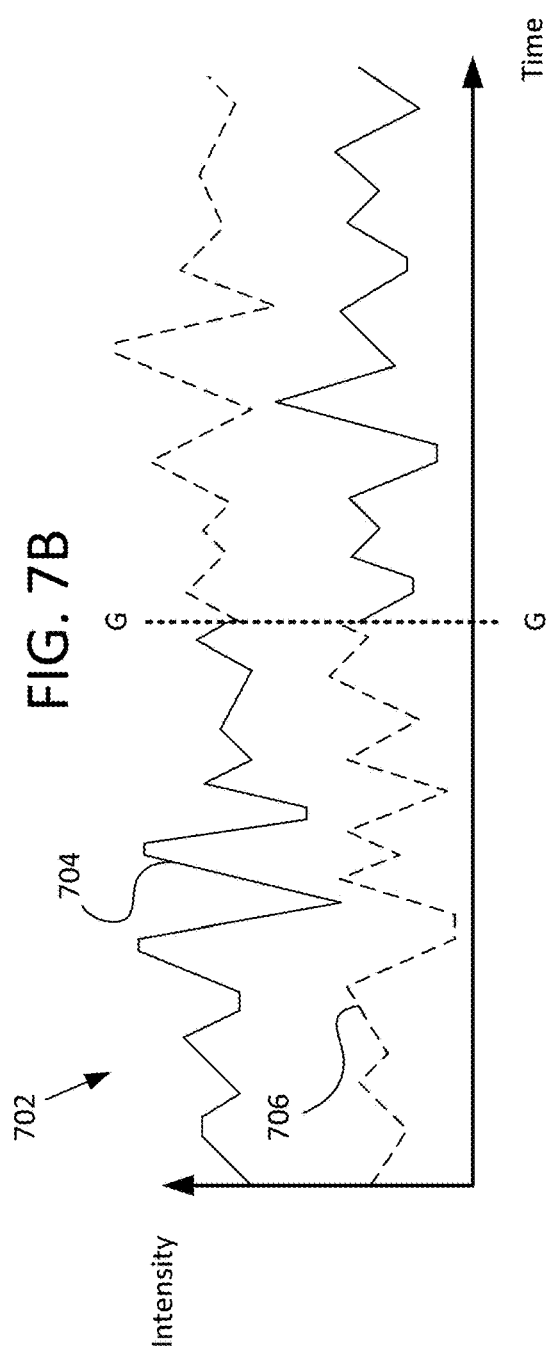

SYSTEMS AND METHODS FOR DETECTING IMPLANTABLE DEVICE ROTATION VIA HEART SOUND MORPHOLOGY

CROSS REFERENCE TO RELATED APPLICATION

This application claims priority to Provisional Application No. 63/294,204, filed Dec. 28, 2021, which is herein incorporated by reference in its entirety.

TECHNICAL FIELD

Embodiments of the present disclosure relate to medical devices and systems for sensing physiological parameters. More specifically, embodiments of the disclosure relate to determining whether an orientation of a medical device has changed.

BACKGROUND

Implantable medical devices (IMDs) may be configured to sense physiological parameters and/or provide therapy. The overall usable volume enclosed within a housing of an IMD may be adjusted based on considerations of patient comfort and performance. Examples of IMDs include implantable cardiac monitors, implantable loop recorders, and the like, which can be configured to be subcutaneously implanted in a patient for monitoring one or more physiological parameters such as, e.g., physiological parameters associated with the heart and/or the lungs.

To facilitate a more comfortable and efficient experience, these devices may be designed to keep the overall volume of the device as small as possible. Each year, the devices become smaller and include sensors with more and more capabilities.

Applicants have realized that, in many cases, the orientation of the sensor relative to the body can be an important input for sensors and algorithms, and some of IMDs have a relatively high probability of rotation in the body due to their geometry.

SUMMARY

Embodiments for detecting implantable medical device orientation changes include, but are not limited to, the following exemplary embodiments.

As recited herein, Example 1 is a medical device with an acceleration sensor configured to generate acceleration data, a processor, and a memory. The memory, which may be a non-transitory computer readable medium, contains computer-executable instructions that, when executed by the processor, causes the processor to perform the following: obtain the acceleration data from a first range of time and a second range of time different from the first range, generate heart sound data based on the acceleration data, and determine that the medical device has flipped in orientation during the second range of time by comparing the heart sound data obtained during the first range of time with the heart sound data obtained during the second range of time.

Example 2 is the medical device of Example 1, such that the medical is determined to have flipped by further performing the following: compare the heart sound data obtained during the second range of time with the heart sound data obtained during the first range of time, identify a change from the heart sound data during the first range of time to the second range of time, and determine, based on the identified change, that the medical device has flipped.

Example 3 is the medical device of Example 2, such that the instructions are further configured to cause the processor to: generate a phonocardiogram based on the heart sound data, and identify the change based on analyzing the phonocardiogram. The medical device is determined to have flipped between the first and second ranges of time when a directionality of the heart sound data is reversed from the first range of time to the second range of time.

Example 4 is the medical device of Example 2 or 3, where the heart sound data includes the acceleration data collected within a span of less than about 1 hour.

Example 5 is the medical device of any preceding Example, where the heart sound data is generated based on the acceleration data using a heart sound generation algorithm. The instructions are further configured to cause the processor to update the heart sound generation algorithm in response to determining that the medical device has flipped.

Example 6 is the medical device of any preceding Example, where the instructions are further configured to cause the processor to perform recalibration of the medical device in response to determining that the medical device has flipped.

Example 7 is the medical device of any preceding Example, where the instructions are further configured to cause the processor to generate an alert notification to a user of the medical device in response to determining that the medical device has flipped.

Example 8 is the medical device of any preceding Example, where the comparison of the acceleration data comprises at least one of: phase comparison analysis, correlation analysis, fiducial comparison analysis, or pattern recognition analysis.

Example 9 is the medical device of any preceding Example, where the instructions are further configured to cause the processor to switch between a low-power communication link and a high-power communication link for the medical device in response to determining that the medical device has flipped.

Example 10 is the medical device of any preceding Example, where the instructions are further configured to cause the processor to obtain additional data during the first range of time and the second range of time such that the additional data includes at least one of: magnetometer measurement data, impedance measurement data, optical sensor measurement data, or temperature measurement sensor, and confirm that the medical device has flipped by comparing the additional data obtained during the first range of time with the additional data obtained during the second range of time.

Example 11 is a processor-implemented method, as recited herein. The method includes obtaining acceleration data from an acceleration sensor of a medical device during a first range of time and a second range of time different from the first range, generating heart sound data based on the acceleration data, and determining that the medical device has flipped during the first or second range of time by comparing the heart sound data obtained during the first range of time with the heart data obtained during the second range of time.

Example 12 is the method of Example 11, which further includes: comparing the heart sound data obtained during the second range of time with at least a portion of the heart sound data obtained during the first range of time, identifying a change from the heart sound data during the first range of time to the second range of time, and determining, based on the identified change, that the medical device has flipped.

Example 13 is the method of Example 12, which further includes: generating a phonocardiogram based on the heart sound data, and identifying the change based on analyzing the phonocardiogram. The medical device is determined to have flipped between the first and second ranges of time when a directionality of the heart sound data is reversed from the first range of time to the second range of time.

Example 14 is the method of Example 12 or 13, where identifying the change includes performing at least one of: phase comparison analysis, correlation analysis, fiducial comparison analysis, or pattern recognition analysis.

Example 15 is the method of any one of Examples 11 through 14, which further includes: obtaining additional data during the first range of time and the second range of time such that the additional data includes at least one of: impedance measurement data, optical sensor measurement data, or temperature measurement sensor, and confirming that the medical device has flipped by comparing the additional data obtained during the first range of time with the additional data obtained during the second range of time.

Example 16 is a system which includes a medical device comprising an acceleration sensor configured to generate acceleration data, a processor and a memory containing computer-executable instructions that, when executed by the processor, cause the processor to perform the following: obtain the acceleration data from a first range of time and a second range of time different from the first range, generate heart sound data based on the acceleration data, and determine that the medical device has flipped in orientation during the second range of time by comparing the heart sound data obtained during the first range of time with the heart sound data obtained during the second range of time.

Example 17 is the system of Example 16, where the instructions are configured to cause the processor to determine that the medical device has flipped by causing the processor to: compare the heart sound data obtained during the second range of time with at least a portion of the heart sound data obtained during the first range of time, identify a change from the heart sound data during the first range of time to the second range of time, and determine, based on the identified change, that the medical device has flipped.

Example 18 is the system of Example 17, where the instructions are further configured to cause the processor to: generate a phonocardiogram based on the heart sound data, and identify the change based on analyzing the phonocardiogram. The medical device is determined to have flipped between the first and second ranges of time when a directionality of the heart sound data is reversed from the first range of time to the second range of time.

Example 19 is the system of Example 16, where the heart sound data includes the acceleration data collected within a span of less than about 1 hour.

Example 20 is the system of Example 16, where the heart sound data is generated based on the acceleration data using a heart sound generation algorithm, and the instructions are further configured to cause the processor to update the heart sound generation algorithm in response to determining that the medical device has flipped.

Example 21 is the system of Example 16, where the instructions are further configured to cause the processor to perform recalibration of the medical device in response to determining that the medical device has flipped.

Example 22 is the system of Example 16, where the instructions are further configured to cause the processor to generate an alert notification to a user of the medical device in response to determining that the medical device has flipped.

Example 23 is the system of Example 16, where the comparison of the acceleration data comprises at least one of: phase comparison analysis, correlation analysis, fiducial comparison analysis, or pattern recognition analysis.

Example 24 is the system of Example 16, where the instructions are further configured to cause the processor to switch between a low-power communication link and a high-power communication link for the medical device in response to determining that the medical device has flipped.

Example 25 is the system of Example 16, where the instructions are further configured to cause the processor to: obtain additional data during the first range of time and the second range of time such that the additional data includes at least one of: magnetometer measurement data, impedance measurement data, optical sensor measurement data, or temperature measurement sensor, and confirm that the medical device has flipped by comparing the additional data obtained during the first range of time with the additional data obtained during the second range of time.

Example 26 is a processor-implemented method which includes: obtaining acceleration data from an acceleration sensor during a first range of time and a second range of time different from the first range, generating heart sound data based on the acceleration data, and determining that the medical device has flipped between the first and second ranges of time by comparing the heart sound data obtained during the first range of time with the heart sound data obtained during the second range of time.

Example 27 is the method of Example 26, which further includes comparing the heart sound data obtained during the second range of time with at least a portion of the heart sound data obtained during the first range of time, identifying a change from the heart sound data during the first range of time to the second range of time, and determining, based on the identified change, that the medical device has flipped.

Example 28 is the method of Example 27, which further includes generating a phonocardiogram based on the heart sound data, and identifying the change based on analyzing the phonocardiogram. The medical device is determined to have flipped between the first and second ranges of time when a directionality of the heart sound data is reversed from the first range of time to the second range of time.

Example 29 is the method of Example 26, which further includes performing at least one of: phase comparison analysis, correlation analysis, fiducial comparison analysis, or pattern recognition analysis, to facilitate the comparison of the acceleration data.

Example 30 is the method of Example 26, which further includes: obtaining additional data during the first range of time and the second range of time such that the additional data includes at least one of: impedance measurement data, optical sensor measurement data, or temperature measurement sensor, and confirming that the medical device has flipped by comparing the additional data obtained during the first range of time with the additional data obtained during the second range of time.

Example 31 are one or more computer-readable media having computer-executable instructions embodied thereon. The instructions are configured to be executed by a processor to cause the processor to: obtain acceleration data from an acceleration sensor of a medical device during a first range of time and a second range of time different from the first range, generate heart sound data from the acceleration data, and determine that the medical device has flipped between the first and second ranges of time by comparing the heart sound data obtained during the first range of time with the heart sound data obtained during the second range of time.

Example 32 is the media of Example 31, where the instructions are further configured to cause the processor to: compare the heart sound data obtained during the second range of time with at least a portion of the heart sound data obtained during the first range of time; identify a change from the heart sound data during the first range of time to the second range of time, and determine, based on the identified change, that the medical device has flipped.

Example 33 is the media of Example 32, where the instructions are further configured to cause the processor to: generate a phonocardiogram based on the heart sound data, and identify the change based on analyzing the phonocardiogram. The medical device is determined to have flipped between the first and second ranges of time when a directionality of the heart sound data is reversed from the first range of time to the second range of time.

Example 34 is the media of Example 31, where the comparison of the acceleration data comprises at least one of: phase comparison analysis, correlation analysis, fiducial comparison analysis, or pattern recognition analysis.

Example 35 is the media of Example 31, where the instructions are further configured to cause the processor to: obtain additional data during the first range of time and the second range of time such that the additional data includes at least one of: impedance measurement data, optical sensor measurement data, or temperature measurement sensor, and confirm that the medical device has flipped by comparing the additional data obtained during the first range of time with the additional data obtained during the second range of time.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

FIG. 7A is an example of the phonocardiogram indicating therein regions or zones in which peaks or nadirs are located, pursuant to FIG. 7.

FIG. 7B is an example of the diagram of the peaks and nadirs indicating a flipping of the IMD, in accordance with embodiments of the disclosure.

Figure 1:
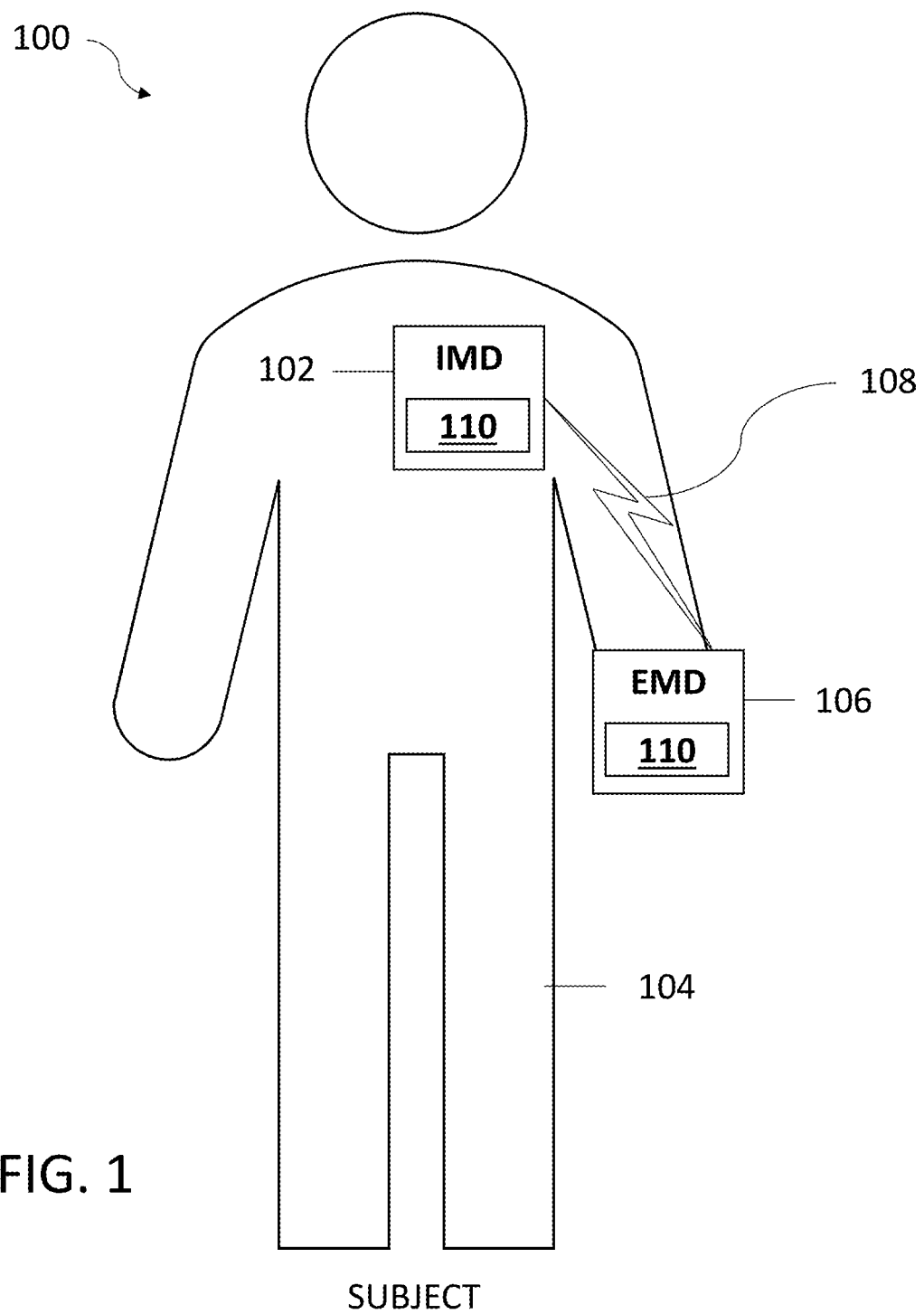
FIG. 1 is a schematic illustration depicting an illustrative medical system, in accordance with embodiments of the disclosure.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

As used herein in association with values (e.g., terms of magnitude, measurement, and/or other degrees of qualitative and/or quantitative observations) that are used herein with respect to characteristics (e.g., dimensions, measurements, attributes, components) and/or ranges thereof, of tangible things (e.g., products, inventory) and/or intangible things (e.g., data, electronic representations of currency, accounts, information, portions of things (e.g., percentages, fractions), calculations, data models, dynamic system models, algorithms, parameters), "about" and "approximately" may be used, interchangeably, to refer to a value, configuration, orientation, and/or other characteristic that is equal to (or the same as) the stated value, configuration, orientation, and/or other characteristic or equal to (or the same as) a value, configuration, orientation, and/or other characteristic that is reasonably close to the stated value, configuration, orientation, and/or other characteristic, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities); preferences; and/or the like.

Although the term "block" may be used herein to connote different elements illustratively employed, the term should not be interpreted as implying any requirement of, or particular order among or between, various blocks disclosed herein. Similarly, although illustrative methods may be represented by one or more drawings (e.g., flow diagrams, communication flows), the drawings should not be interpreted as implying any requirement of, or particular order among or between, various steps disclosed herein. However, certain embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values) may include one or more items, and, similarly, a subset or subgroup of items may include one or more items. A "plurality" means more than one.

DETAILED DESCRIPTION

Embodiments of the disclosure use various approaches to determine a change in orientation of an implantable medical device (IMD). The IMD may be configured to obtain acceleration data (e.g., heart sound data) and such data is analyzed to determine whether the IMD has flipped. According to embodiments, an IMD has flipped when its orientation with respect to at least one axis (e.g., longitudinal axis) has changed by approximately 180 degrees.

FIG. 1 shows an illustrative medical system 100, in accordance with embodiments of the disclosure. As shown in FIG. 1, the medical system 100 includes an IMD 102 configured to be implanted within the body of a subject 104, and an external monitoring device (EMD) 106, which is communicatively coupled to the IMD 102 via a communication link 108. In the illustrated embodiments, the medical system 100 is operatively coupled to the subject 104, and the IMD 102 and the EMD 106 are configured to communicate with one another over the communication link 108.

As will be described below in more detail, the IMD 102 can be configured to sense various physiological parameters such as heart sounds. The opening and closing of valves, as well as aspects of the flow of blood through the heart, produce acoustic and/or vibratory physiological signals known as heart sounds. Heart sounds may be measured and used, for example, to indicate the heart's mechanical activities. Heart sounds may, for example, reveal signs of elevated filling pressure, weakened ventricular contraction, and/or the like. Heart sounds may be used as part of a predictive algorithm used to predict physiological events. A heart sound can include audible and inaudible mechanical vibrations caused by cardiac activity that can be sensed with an accelerometer or acceleration sensor. Accordingly, when a sensor such as an accelerometer is used to sense heart sounds, the scope of energy included in the sensed "acoustic signal" extends to energies associated with such mechanical vibrations.

There are different types of heart sounds. For example, S1 refers to the first heart sound of a cardiac cycle, S2 refers to the second heart sound, S3 refers to the third heart sound, and S4 refers to the fourth heart sound. A "heart beat" includes a cardiac cycle. An "S3 beat" includes a cardiac cycle during which S3 is detected. An "S3 index," also referred to as an "S3 ratio," includes a ratio of the number of the S3 beats to the number of the total heart beats, both detected during the same time period.

S1 is known to be indicative of, among other things, mitral valve closure, tricuspid valve closure, and aortic valve opening. S2 is known to be indicative of, among other things, aortic valve closure and pulmonary valve closure. S3 is known to be a ventricular diastolic filling sound often indicative of certain pathological conditions including heart failure. S4 is known to be a ventricular diastolic filling sound resulted from atrial contraction and is usually indicative of pathological conditions. Data associated with any number of different heart sounds may be used to diagnose, predict, characterize, control treatment of, and/or otherwise analyze any number of different aspects of conditions, illnesses, states of being, and/or the like.

The IMD and EMD

According to embodiments, the IMD 102 may a control device, a monitoring device, a pacemaker, an implantable cardioverter defibrillator (ICD), a cardiac resynchronization therapy (CRT) device and/or the like and may be an implantable medical device known in the art or later developed, for providing therapy and/or diagnostic data about the subject 104 and/or the IMD 102. In various embodiments, the IMD 102 may include both defibrillation and pacing/CRT capabilities (e.g., a CRT-D device).

In embodiments, the IMD 102 may be implanted subcutaneously within an implantation location or pocket in the patient's chest or abdomen and may be configured to monitor (e.g., sense and/or record) physiological parameters associated with the patient's heart. In embodiments, the IMD 102 may be an implantable cardiac monitor (ICM) (e.g., an implantable diagnostic monitor (IDM), an implantable loop recorder (ILR)) configured to record physiological parameters such as, for example, one or more cardiac electrical signals, heart sounds, heart rate, blood pressure measurements, oxygen saturations, and/or the like.

In embodiments, the IMD 102 may be configured to detect a variety of physiological signals that may be used in connection with various diagnostic, therapeutic and/or monitoring implementations. For example, the IMD 102 may include sensors or circuitry for detecting respiratory system signals, cardiac system signals, heart sounds. and/or signals related to patient activity. In embodiments, the IMD 102 may be configured to sense intrathoracic impedance, from which various respiratory parameters may be derived, including, for example, respiratory tidal volume and minute ventilation.

In embodiments, sensors and associated circuitry may be incorporated in the IMD 102 for detecting one or more body movement or body posture and/or position related signals. For example, accelerometers and/or GPS devices may be employed to detect patient activity, patient location, body orientation, and/or torso position. According to embodiments, for example, the IMD 102 may include an acceleration sensor 110 configured to generate an acceleration signal and/or acceleration data, which may include the acceleration signal, information derived from the acceleration signal, and/or the like. In embodiments, the acceleration data includes acceleration measurements associated with movement of the IMD 102. In embodiments, the acceleration sensor may be, or include, any acceleration sensor able to generate measurements associated with its motion. An "acceleration sensor" or "accelerometer" as used herein, may be, or include, any type of accelerometer, gyroscope, magnetometer, inertial measurement unit (IMU), and/or any other type of sensor or combination of sensors configured to measure changes in acceleration, angular velocity, and/or the like. According to embodiments, acceleration data may be used to determine that the IMD 102 has flipped.

Derived parameters may also be monitored using the IMD 102. For example, a sleep sensor may rely on measurements taken by an implanted accelerometer that measures body activity levels. The sleep sensor may estimate sleeping patterns based on the measured activity levels. Other derived parameters include, but are not limited to, a functional capacity indicator, autonomic tone indicator, sleep quality indicator, cough indicator, anxiety indicator, and a cardiovascular wellness indicator for calculating a quality of life indicator quantifying a subject's overall health and well-being.

In various embodiments, the EMD 106 may be a device that is configured to be portable with the subject 104, e.g., by being integrated into a vest, belt, harness, sticker; placed into a pocket, a purse, or a backpack; carried in the subject's hand; and/or the like, or otherwise operatively (and/or physically) coupled to the subject 104. The EMD 106 may be configured to monitor (e.g., sense and/or record) physiological parameters associated with the subject 104 and/or provide therapy to the subject 104. For example, the EMD 106 may be, or include, a wearable cardiac defibrillator (WCD) such as a vest that includes one or more defibrillation electrodes. In embodiments, the EMD 106 may include any number of different therapy components such as, for example, a defibrillation component, a drug delivery component, a neurostimulation component, a neuromodulation component, a temperature regulation component, and/or the like. In embodiments, the EMD 106 may include limited functionality, e.g., defibrillation shock delivery and communication capabilities, with arrhythmia detection, classification and/or therapy command/control being performed by a separate device such as, for example, the IMD 102.

In embodiments, the communication link 108 may be, or include, a wireless communication link such as, for example, a short-range radio link, such as Bluetooth, IEEE 802.11, a proprietary wireless protocol, and/or the like. In embodiments, for example, the communication link 108 may utilize Bluetooth Low Energy radio, or a similar protocol, and may utilize an operating frequency in the range of 2.40 to 2.48 GHz. The term "communication link" may refer to an ability to communicate some type of information in at least one direction between at least two devices and should not be understood to be limited to a direct, persistent, or otherwise limited communication channel. That is, according to embodiments, the communication link 108 may be a persistent communication link, an intermittent communication link, an ad-hoc communication link, and/or the like. The communication link 108 may refer to direct communications between the IMD 102 and the EMD 106, and/or indirect communications that travel between the IMD 102 and the EMD 106 via at least one other device (e.g., a repeater, router, hub). The communication link 108 may facilitate uni-directional and/or bi-directional communication between the IMD 102 and the EMD 106. Data and/or control signals may be transmitted between the IMD 102 and the EMD 106 to coordinate the functions of the IMD 102 and/or the EMD 106. In embodiments, patient data may be downloaded from one or more of the IMD 102 and the EMD 106 periodically or on command. The physician and/or the patient may communicate with the IMD 102 and the EMD 106, for example, to acquire patient data or to initiate, terminate and/or modify recording and/or therapy.

In embodiments, the IMD 102 and/or the EMD 106 may provide one or more of the following functions with respect to a patient: sensing, data analysis, and therapy. For example, in embodiments, the IMD 102 and/or the EMD 106 may be used to measure any number of a variety of physiological, device, subjective, and/or environmental parameters associated with the subject 104, using electrical, mechanical, and/or chemical means. The IMD 102 and/or the EMD 106 may be configured to automatically gather data, gather data upon request (e.g., input provided by the subject, a clinician, another device), and/or any number of various combinations and/or modifications thereof. The IMD 102 and/or EMD 106 may be configured to store data related to the physiological, device, environmental, and/or subjective parameters and/or transmit the data to any number of other devices in the system 100. In embodiments, the IMD 102 and/or the EMD 106 may be configured to analyze data and/or act upon the analyzed data. For example, the IMD 102 and/or EMD 106 may be configured to modify therapy, perform additional monitoring, and/or provide alarm indications based on the analysis of the data.

In embodiments, the IMD 102 and/or the EMD 106 may be configured to provide therapy. Therapy may be provided automatically and/or upon request (e.g., an input by the subject 104, a clinician, another device or process). The IMD 102 and/or the EMD 106 may be programmable in that various characteristics of their sensing, therapy (e.g., duration and interval), and/or communication may be altered by communication between the devices 102 and 106 and/or other components of the system 100.

The illustrative cardiac monitoring system 100 shown in FIG. 1 is not intended to suggest any limitation as to the scope of use or functionality of embodiments of the present disclosure. The illustrative cardiac monitoring system 100 should not be interpreted as having any dependency or requirement related to any single component or combination of components illustrated therein. Additionally, various components depicted in FIG. 1 may be, in embodiments, integrated with various ones of the other components depicted therein (and/or components not illustrated), all of which are considered to be within the ambit of the subject matter disclosed herein.

Various components depicted in FIG. 1 may operate together to form the monitoring system 100, which may be, for example, a computerized patient management and monitoring system. In embodiments, the system 100 may be designed to assist in monitoring the subject's condition, managing the subject's therapy, and/or the like.

Figure 2:
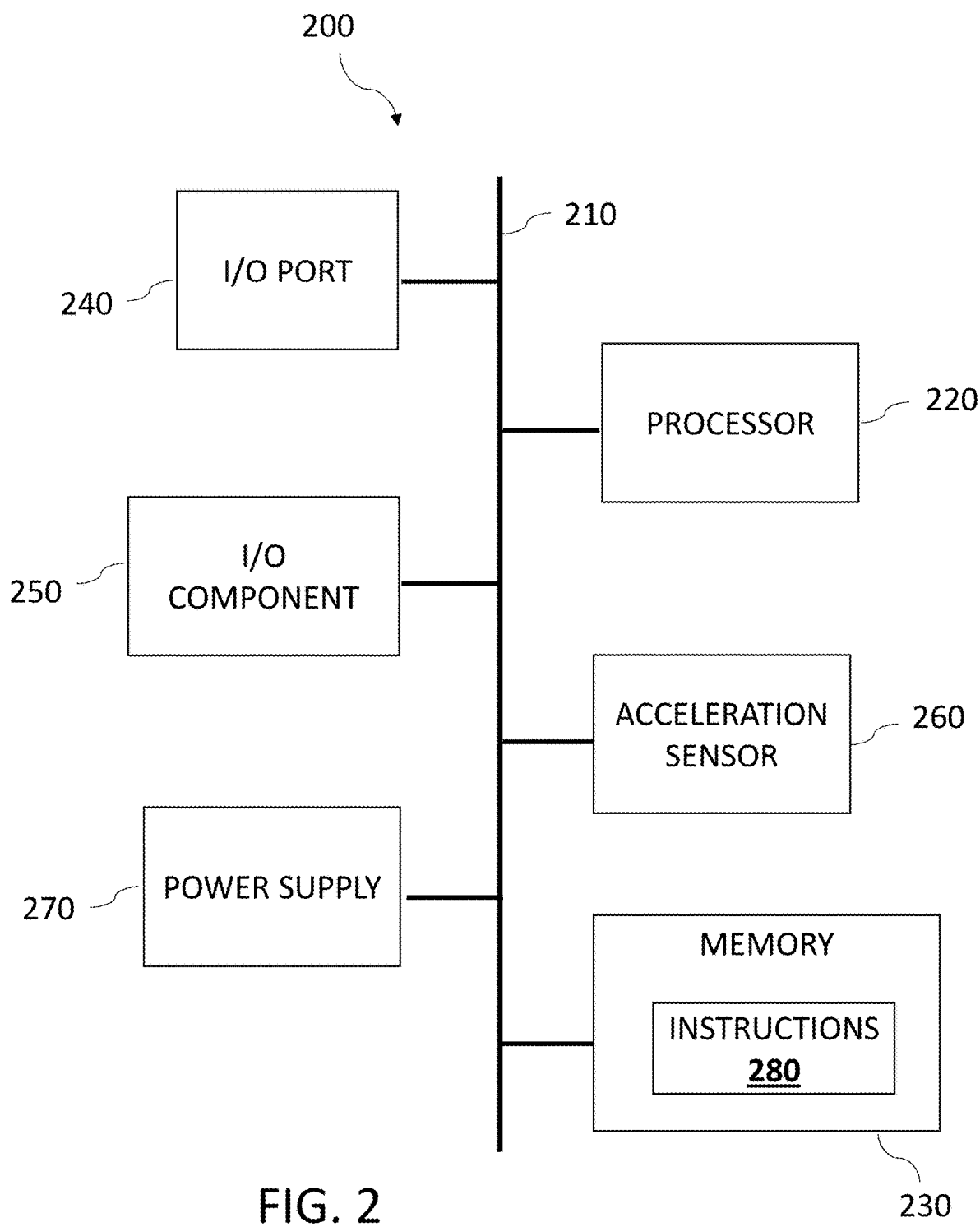
FIG. 2 is a block diagram depicting an illustrative computing device, in accordance with embodiments of the disclosure.

Any number of components of the system 100 may be implemented using one or more computing devices. That is, for example, IMD 102 and/or EMD 106 may be implemented on one or more computing devices. FIG. 2 is a block diagram depicting an illustrative computing device 200, in accordance with embodiments of the disclosure. The computing device 200 may include any type of computing device suitable for implementing aspects of embodiments of the disclosed subject matter. Examples of computing devices include specialized computing devices or general-purpose computing devices such "workstations," "servers," "laptops," "desktops," "tablet computers," "hand-held devices," "smartphones," "general-purpose graphics processing units (GPGPUs)," and the like, all of which are contemplated within the scope of FIGS. 1 and 2, with reference to various components of the system 100 and/or computing device 200.

In embodiments, the computing device 200 includes a bus 210 that, directly and/or indirectly, couples one or more of the following devices: a processor 220, a memory 230, an input/output (I/O) port 240, an I/O component 250, an acceleration sensor 260 (e.g., the acceleration sensor 110 depicted in FIG. 1), and a power supply 270. Any number of additional components, different components, and/or combinations of components may also be included in the computing device 200. The I/O component 250 may include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 210 represents what may be one or more busses (such as, for example, an address bus, data bus, or combination thereof). Similarly, in embodiments, the computing device 200 may include a number of processors 220, a number of memory components 230, a number of I/O ports 240, a number of I/O components 250, a number of acceleration sensors 260, and/or a number of power supplies 270. Additionally, any number of these components, or combinations thereof, may be distributed and/or duplicated across a number of computing devices.

In embodiments, the memory 230 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In embodiments, the memory 230 stores computer-executable instructions 280 for causing the processor 220 to implement aspects of embodiments of system components discussed herein and/or to perform aspects of embodiments of methods and procedures discussed herein.

The computer-executable instructions 280 may include, for example, computer code, machine-useable instructions, and the like such as, for example, program components capable of being executed by one or more processors 220 associated with the computing device 200. Program components may be programmed using any number of different programming environments, including various languages, development kits, frameworks, and/or the like. Some or all of the functionality contemplated herein may also, or alternatively, be implemented in hardware and/or firmware.

According to embodiments, for example, the instructions 280 may be configured to be executed by the processor 220 and, upon execution, to cause the processor 220 to perform certain processes. In certain embodiments, the processor 220, memory 230, and instructions 280 are part of a controller such as an application specific integrated circuit (ASIC), field-programmable gate array (FPGA), and/or the like. Such devices can be used to carry out the functions and steps described below.

Determining a Change in Orientation of the IMD

Figure 3A:
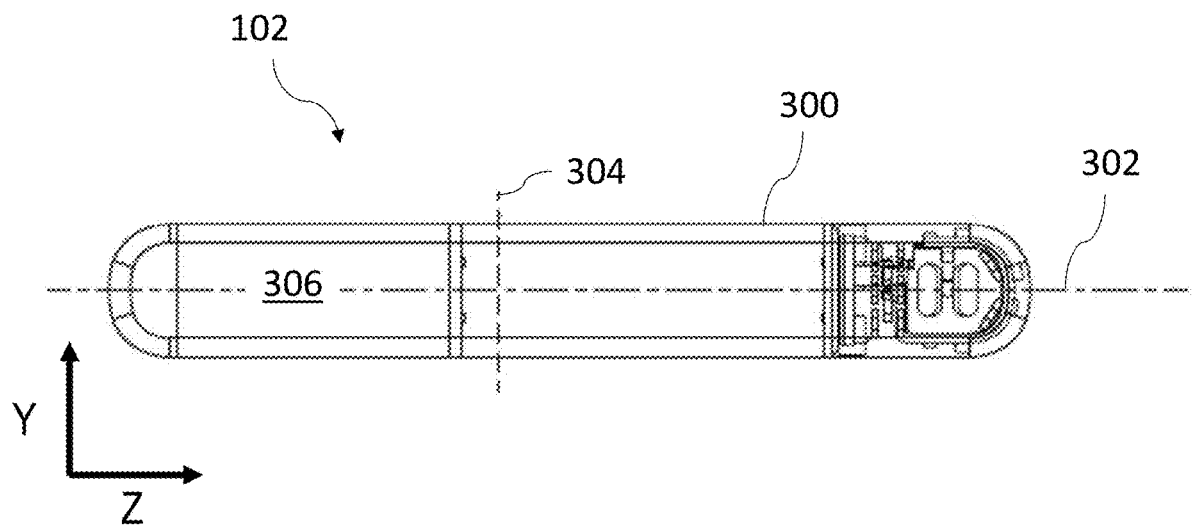
FIGS. 3A and 3B show different views of an implantable medical device, in accordance with embodiments of the disclosure.
Figure 3B:
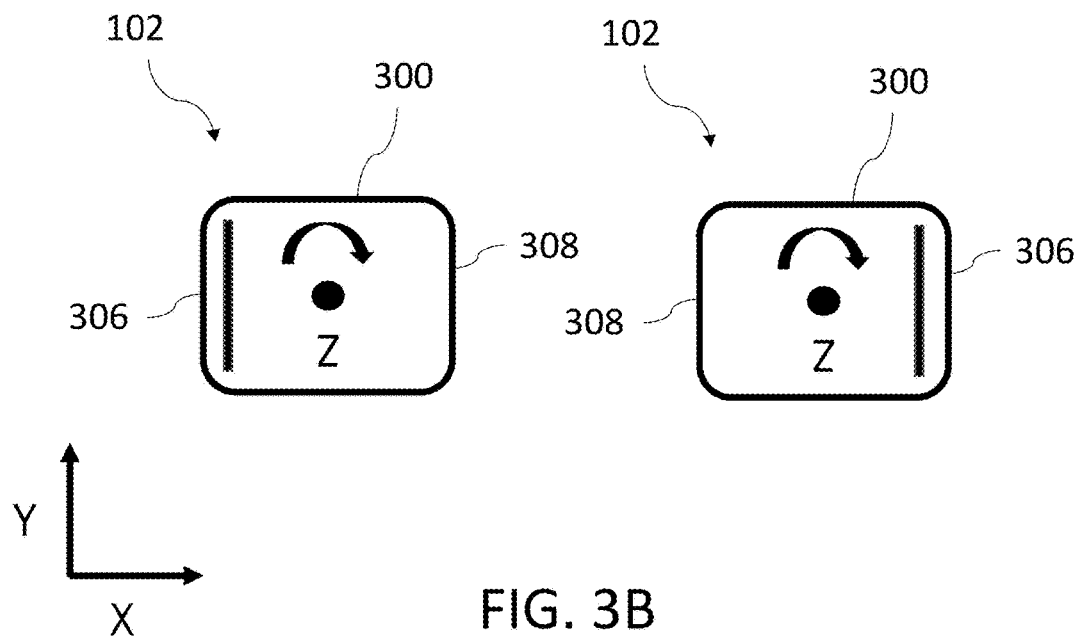

Embodiments of the present disclosure involve various approaches for determining when the IMD 102 has flipped when implanted in a patient's body. FIGS. 3A and 3B show an example IMD 102. As shown in FIGS. 3A and 3B, the IMD 102 includes a body 300 that defines outer shape of the IMD 102. The IMD 102 in FIGS. 3A and 3B, as just one example, extends lengthwise along a Z-axis 302 which extends across the page in FIG. 3A and into and out of the page in FIG. 3B. The IMD 102 has a height along a Y-axis 304. The IMD 102 has multiple outer faces or sides. For example, FIG. 3B includes reference numbers for two of the sides of the IMD 102. One side is denoted with reference number 306 and the opposite side is denoted with reference number 308.

In embodiments, when the IMD 102 has flipped, the sides 306 and 308 have switched places as can be seen in comparing the two schematics of the IMD 102 in FIG. 3B. For example, when the IMD 102 has rotated around the Z-axis 302, the IMD 102 can be considered to have flipped. In some embodiments, when the IMD has flipped along any one of the aforementioned axes, the coordinates of a point on a surface of the IMD (or in some examples, inside the IMD) change accordingly. For example, when the IMD flips along the X-axis, the Y-component and the Z-component of the coordinate change, such as by changing the sign in each component (from positive to negative, or vice versa). This property of sign change can be utilized to effectively determine or confirm that the IMD has flipped, as further explained herein. When an IMD flips when implanted in a patient's body, the orientation change can affect various aspects of the IMD. For example, as will be described in more detail below, flipping can affect one or more of the following: posture algorithms/determinations, heart sound detection, impedance measurements, optical measurements, and temperature measurements.

In certain embodiments, acceleration data in the form of heart sound data is used to determine whether the IMD 102 has flipped.

Figures 4, 5:
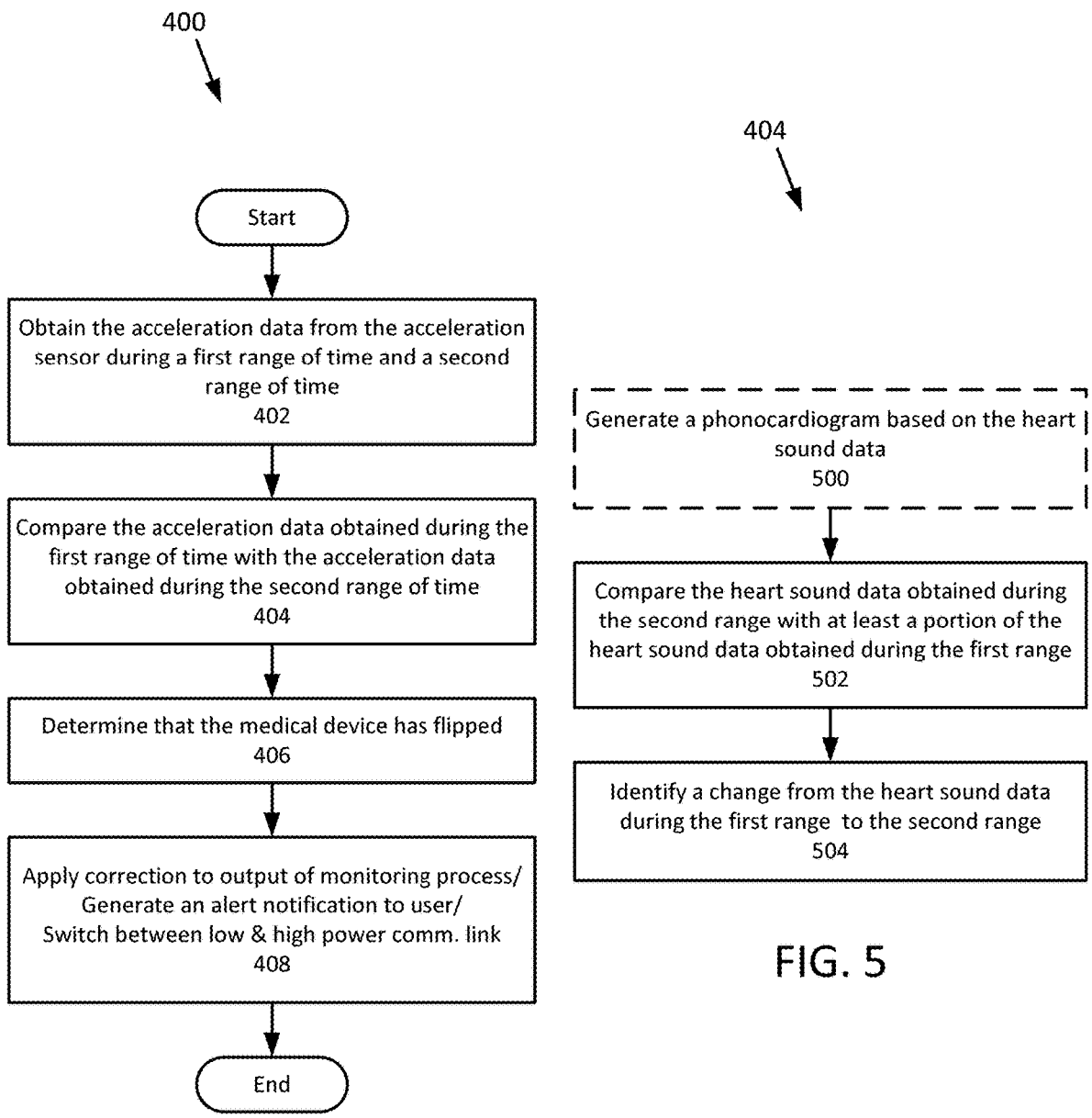
FIG. 4 is a flow diagram depicting an illustrative method of medical device operation, in accordance with embodiments of the disclosure.
FIG. 5 is a flow diagram depicting an illustrative method of medical device operation in part of the flow diagram of FIG. 4, in accordance with embodiments of the disclosure.

As shown in FIG. 4, a process 400 according to some embodiments, may include having a processor obtain the acceleration data (including a plurality of acceleration measurements taken of the IMD 102) from the acceleration sensor during a first range of time and a second range of time different from the first range, in step 402. Then, the processor, in step 404, compares the acceleration data obtained during the first range of time with the acceleration data obtained during the second range of time. For example, heart sound data can be extracted from the acceleration data, and the heart sound data over different time ranges can be compared to each other.

Based on the comparison, the processor, in step 406, determines that the IMD has flipped between the first and second ranges of time. In some examples, the determination that the IMD has flipped causes the processor to perform one or more of the following: apply correction to output of monitoring process, such as updating the heart sound generation algorithm (which is used to generate the heart sound data based on the acceleration data obtained using the accelerometer) and/or performing recalibration of the IMD; generate an alert notification to a user (e.g., patient using the IMD, doctor, caregiver); and/or switch between the low-powered communication link and the high power communication link (which may be Bluetooth, for example), in step 408.

FIG. 5 shows a more detailed process of step 404 performed in some embodiments. The step 404 includes step 502 which causes the processor to compare the heart sound data obtained during the second range of time with at least a portion of the heart sound data obtained during the first range of time. In step 404, the processor identifies a change from the heart sound data during the first range of time to the second range of time. After this identification, the processor may proceed to step 406 in process 400 such that the processor determines that the IMD has flipped, based on the identified change in step 504.

In some examples, step 404 may also involve step 500 before step 502. In step 500, the processor generates a phonocardiogram (described in more detail below) based on the heart sound data. The generated phonocardiogram—which shows the morphology of the heart sound as detected—can be used in step 404 to identify the change based on the processor analyzing the phonocardiogram. Specifically, the IMD is determined to have flipped between the first and second ranges of time when a directionality of the heart sound data is reversed (e.g., the heart sound data has inverted) from the first range of time to the second range of time.

In some embodiments, step 406 may involve one or more additional steps, for example as a means of verifying or confirming whether the medical device has flipped. For example, the processor may identify an X-axis, a Y-axis, and a Z-axis of the medical device. These axes may be determined based on the detected orientation of the medical device at a certain time. The processor may determine a sign for each of the X-axis, the Y-axis, and the Z-axis during the first range of time and the second range of time. The sign may be either positive or negative, and associated with a point relative to the "origin" or center of the medical device from which the axes originate. That is, the point (for example, based on a marker or a physical region on a surface of the medical device) on an axis is assigned either a positive sign or a negative sign depending on its position relative to the origin of the axis, and this information or data is recorded during both the first range of time and the second range of time. Subsequently, the processor may determine that the sign of a predetermined point has changed between the two ranges of time (that is, from positive to negative or negative to positive) in any two of the following axes: X-axis, Y-axis, or Z-axis. If so, the processor determines (or, if a determination has been previously made, confirms) that the medical device has indeed flipped.

In some embodiments, instead of determining a sign for each of the axes, the processor may determine a primary sign associated with a point along a primary axis, where the primary axis is selected from one of the X-axis, the Y-axis, or the Z-axis. The primary sign is determined during the first range of time and the second range of time. If the processor determines that the primary sign associated with the point has changed from positive to negative or from negative to positive between the two ranges of time, the processor may determine that the medical device has flipped, or tentatively determine that the medical device may have flipped. In some embodiments, such tentative determination may be further confirmed by determining a secondary sign associated with a different point along a secondary axis, where the secondary axis is different from the primary axis and is selected from one of the X-axis, Y-axis, or the Z-axis (that is, one of the other two axes that were not selected as the primary axis). The secondary sign is also determined during the first range of time and the second range of time. If the processor determines that the secondary sign associated with the other point has changed from positive to negative or from negative to positive between the two ranges of time, the processor may confirm that the medical device has indeed flipped.

Figure 6:
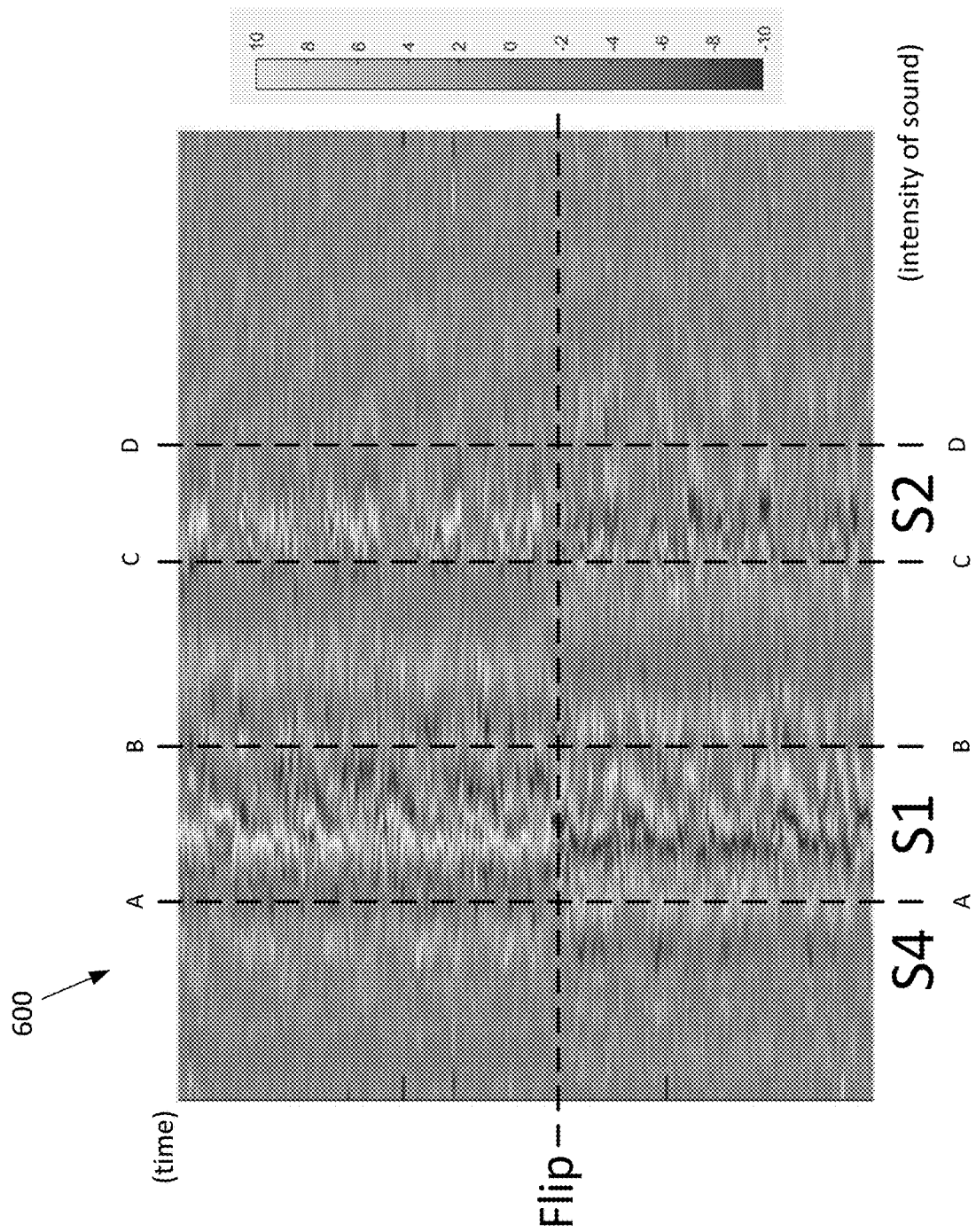
FIG. 6 is an example of a phonocardiogram generated in accordance with certain embodiments of the disclosure.

FIG. 6 illustrates an example of a phonocardiogram 600 generated as per step 400. There are three distinct regions observable in the phonocardiogram 600, with a region between lines A and B representing the heart sound S1, a region between lines C and D representing the heart sound S2, and a region below line A representing the heart sound S4. The x-axis represents the power or intensity of the detected heart sound, and the y-axis represents time during which the measurements are taken. The time indicated as "Flip" is when the IMD is observed to have flipped along an axis.

The accelerometer of the IMD measured the scalar value of acceleration. The scalar value of acceleration can be translated to an intensity or power of a heart sound signal. The phonocardiogram 600 represents the intensity and directionality of the measured heart sound signals using different colors. For example, sections with the greatest intensity in the positive direction (a.k.a. peaks) are shown using "yellow," and sections with the greatest intensity in the negative direction (a.k.a. nadirs) are shown using "deep blue," with various intermediate values shown using different shades of green and light blue, for example. Although the figure is color-coded, it is to be understood that, in some examples, the phonocardiogram may be represented using other methods, as can be appreciated, such as a black-and-white or grayscale format where differing colors are alternatively represented by appropriate imagery that conveys meaning in a black-and-white image such as with the use of cross-hatching or stippling. As can also be appreciated, another format can be a numerical format where numerical thickness or volume values are presented by small numbers displayed on and about phonocardiogram where the colors are usually displayed.

The processor generates the phonocardiogram 600 in order to compare the intensity and directionality for the purpose of detecting whether the IMD has flipped. For example, the comparison may involve determining two separate ranges or spans of time, a first range and a second range, which chronologically follows the first range. The first and second ranges of time may or may not be immediately next to each other. In some examples, there may be a span of time between the two ranges. Once the two ranges are determined, the details of the phonocardiogram 600 observed during the first and the second ranges are compared with each other, and when there is an observable difference in directionality in the details (e.g., there is a change such as an inversion in the heart sound data), the processor determines that the IMD has flipped between the first and second ranges of time.

In some examples, the change is observed based on the detected directionality of the heart sound signals. For example, as explained above, the maximum intensity in the positive direction is shown in yellow on the phonocardiogram 600 whereas the maximum intensity in the negative direction is shown in deep blue. When the same region of heart sound (that is, S1, S2, and/or S4 shown on the figure) is observed along the time axis from top down, it is apparent that the region where there used to be yellow-coded heart sound signal before the flip (a first range of time) has deep-blue-coded heart sound signal after the flip (a second range of time), which indicates that the IMD has flipped, thereby reversing the directionality of the detected signal thereafter.

In some examples, the specific timespan of the first and second ranges of time may be determined by how often the processor receives data from the IMD in question. For example, if the IMD transmits acceleration data or heart sound data only once every predetermined time interval (for example, 5 minutes, 10 minutes, 20 minutes, half an hour, 1 hour, 2 hours, 3 hours, 4 hours, 6 hours, 12 hours, 24 hours, or any other suitable time interval therebetween), the timespan of each range of time would be equal to or greater than the predetermined time interval, since the processor cannot obtain the data faster or more often than the IMD is programmed to transmit it. In some examples, the heart sound data used to determine the flipping of the IMD includes the acceleration data collected within a span of less than about one day, less than about 6 hours, less than about 1 hour, or less than about half an hour, as suitable.

In some examples, the comparison involves the processor performing at least one of: phase comparison analysis, correlation analysis, fiducial comparison analysis, or pattern recognition analysis. It is to be understood that any other types of comparison analysis may be performed using the same obtained data, as known in the art.

In a phase comparison analysis, the processor determines the phase of heart sound signal from the data generated in the first range of time and the second range of time, then compares the determined phases to calculate the difference between the phases. If the calculated difference indicates a phase shift in the heart sound signal or is greater than a predetermined threshold, the processor determines that the IMD has flipped. In certain embodiments, the phase comparison analysis is performed by comparing the phase shift in S1 and/or S2 heart sounds over time. These two heart sounds may be easier to detect based on acceleration data from an accelerometer of the IMD.

In a correlation analysis, the processor determines the correlation between the heart sound data during the first and second ranges of time, for example by generating a correlation map using the data from the two ranges of time. In some examples, if the correlation between the data taken during the two ranges of time is approximately -1, it would indicate a negative relationship (that is, the higher value measured in the first range of time corresponds to the lower value measured in the second range of time, or vice versa), and the processor determines that the IMD has flipped.

In a fiducial comparison analysis, a fiducial marker (or points assumed as a fixed basis of comparison) is determined in the data obtained during the two ranges of time. The fiducial marker may include peaks and/or nadirs of a waveform of a heart sound such as S1, S2, S3, or S4, as appropriate. The fiducial from the first range of time is then compared to the fiducial from the second range of time, and if there is an observable difference, for example a difference in the fiducial values exceeding a predetermined threshold, the processor determines that the IMD has flipped.

In a pattern recognition analysis, the processor determines a pattern in the data obtained during the first range of time and another pattern in the data obtained during the second range of time. The pattern may be determined using any suitable method such as pattern recognition algorithm as known in the art, for example, and the two patterns are then compared with each other. If the patterns at least substantially mirror each other or are reversed with respect to each other, for example one pattern having a positive directionality while the other pattern has a negative directionality in the same corresponding portion of the respective patterns, or vice versa, the processor determines that the IMD has flipped.

In some examples, the processor may obtain additional data to either assist in the determination that the IMD has flipped, or to use the additional data as confirmation that the medical device has flipped once that determination has been made. For example, the additional data may include at least one of: magnetometer measurement data, impedance measurement data, optical sensor measurement data, or temperature measurement sensor. These data, as well as additional suitable data such as Bluetooth signal strength measurement, may be used by the processor to confirm that the IMD has flipped, by comparing the additional data obtained during the first range of time with the additional data obtained during the second range of time.

Measurement data from a magnetometer may be used in providing additional acceleration data to corroborate with the acceleration data measured by an accelerometer. Additionally or alternatively, the magnetometer may determine a posture of the user by measuring the direction, strength, or relative change of a magnetic field at a particular location such that, when the IMD is flipped, the measured direction, strength, or relative change of the magnetic field at the same location may be altered. When such alteration exceeds a predetermined threshold value, the processor can use such information to confirm that the IMD has flipped.

Impedance measurement data, such as those obtained via impedance electrodes installed on the IMD, may be used to detect the impedance measurement taken from the tissues surrounding the medical device. If the IMD is flipped, the impedance vector will change, thereby causing the amplitude of the signal to jump, which may result in impaired impedance sensing. When the IMD flips, the impedance of the tissues or tissue paths surrounding the IMD, or more specifically the tissues or tissue paths in direct or indirect contact with the impedance electrodes installed on the medical device, may either increase (e.g., the tissue below is deeper or thicker, therefore the tissue path is longer and more perfused) or decrease (e.g., the tissue below is thinner). When the change in the impedance exceeds a threshold value, the processor can use the information to confirm that the IMD has flipped.

Measurement data from an optical sensor installed on the IMD may be used to determine the conditions surrounding the IMD. Detecting a flip is relevant for optical sensors as well because the flip may impact the accuracy of such sensors. For example, an intensity of the ambient light (or brightness) and/or a background radiation detected by the optical sensor can be used as a factor in determining the direction in which the optical sensor is facing; usually, the implanted optical sensor detects greater intensity of light or background radiation while facing forward, or facing toward the chest, than while facing backward, or toward the back or the spine, in some examples. Therefore, when the brightness or background radiation increases or decreases beyond a predetermined threshold value, the processor can use the information to confirm that the IMD has flipped, because the optical sensor is now facing the other direction from when it was previously measured.

Temperature measurement, obtained from a thermometer for example, can also help determine that the IMD has flipped. For example, there may be a change in temperature when the thermometer installed on the IMD is flipped, because the thermometer may be closer or further from an organ which generates body heat, including but not limited to the heart. Furthermore, body heat may also be generated by contraction of skeletal muscles, so depending on where the IMD is implanted, the IMD may also detect an increase in temperature when the thermometer is directed toward such heat source. In any event, when there is a change in the detected temperature beyond a predetermined threshold, the processor can use the information to confirm that the IMD has flipped.

Figure 7:
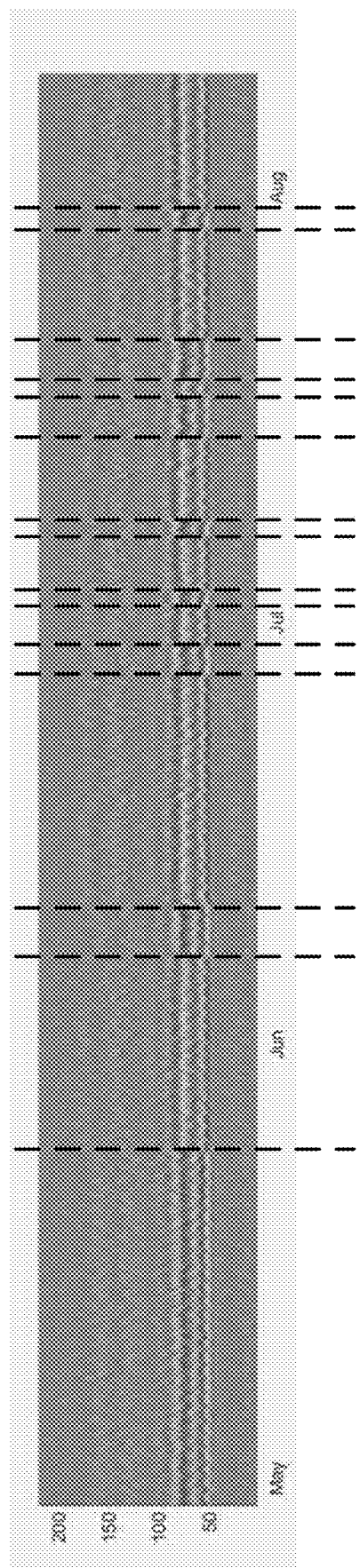
FIG. 7 is another example of a phonocardiogram generated in accordance with certain embodiments of the disclosure.

FIG. 7 illustrates how often the IMD may be prone to flipping using phonocardiogram 700. The vertical lines indicate the corresponding points on the phonocardiogram 700 indicating the changes in the heart sound signal data, as determined using method explained herein. The data taken during a span of more than three months (e.g., from the beginning of May to early August) shows that the phonocardiogram 700 indicates fifteen instances of flipping, which are indicated by inversions or changes in directionally of the heart sound data over time.

FIG. 7A illustrates a plurality of zones for heart sound signal data represented in FIG. 7. For example, a majority of the heart sound signal data with sections having the peaks is located within the zone (or region) E whereas a majority of the heart sound signal data with sections having the nadirs is located within the zone (or region) F, where each section is filled using a different pattern. The peaks and nadirs may be detected or determined using any suitable means including but not limited to applying boundary identification algorithm on the phonocardiogram 700, for example. The instances of IMD flipping are detected when the zones E and F reverse their positions. As used herein, the "majority" indicates at least about 70%, 75%, 80%, 85%, 90%, 95%, or any range or value therebetween, of the corresponding peaks or nadirs being located within the appropriate zone.

FIG. 7B illustrates an exemplary diagram 702 showing the peaks and nadirs obtained based on the phonocardiogram 700, for example. Peaks 704 (continuous line) and nadirs 706 (broken line) are shown using different types of line. When the IMD flips at a time indicated by a dotted line G in the diagram 702, the peaks and nadirs are observed to reverse their positions (or measurement with respect to intensity), and as such, it can be determined that the IMD has flipped at or around the time G in which the reversal in peak and nadir measurements was observed. In some examples, the determination of time G is instantaneous or near-instantaneous, while in some examples, the time G is determined when the IMD transmits its measurements data in the next transmission period as scheduled. In some examples, there may be a time lag between when the flipping takes place and when the flipping is actually detected by the system. The time lag may be less than a day, less than half a day, less than a few hours, less than an hour, less than half an hour, or any other suitable range of time therebetween, for example.

After the processor has determined that the IMD has flipped, there are a plurality of actions that the processor may choose from to implement. Accordingly, in some embodiments, any number of different monitoring processes may be corrected to account for the fact that the orientation has changed from its assumed (or previously determined) orientation. Applying a correction to an output of a monitoring process may be achieved by modifying an output directly and/or by recalibrating the monitoring process to account for the different (e.g., flipped) orientation of the IMD. In some embodiments, the monitoring process may include, for example, a posture algorithm (e.g., an algorithm configured to monitor a sleep incline), a heart sounds algorithm, and/or an impedance sensing process.

In some examples, the processor also applies a label to the generated data to mark when the device has flipped, such that it can be referenced later on by physicians, or alternatively by researchers and developers wanting to improve upon the IMD to reduce such flipping, for example. In some examples, the flipping causes the processor to switch between low-power and high-power Bluetooth connection link, such that the appropriate power setting is used based on the current position of the IMD, which may benefit in saving battery power by reducing the power when the IMD is facing forward or toward the chest, for example. In some examples, the processor may transmit alert notifications such as an alarm, email or text message, automated phone call, etc., to notify the user, who may be the patient or the doctor, physician, or caretaker responsible for monitoring the patient's health.

Advantages of implementing the aforementioned flip detection method include increased accuracy in the determination that the IMD has flipped. By comparing the directionality of the generated heart sound data, for example, the processor can more accurately determine the occurrences of flipping, and when it does, the processor can take the appropriate actions to either alert the user or to apply correction to the output of monitoring process to improve the accuracy thereof. As the complexity of IMDs increases (and overall size decreases), it is important to accurately determine such changes in orientation. Also, the determination of whether the IMD has flipped can be made in a shorter period of time, such as less than a day, less than half a day, less than a few hours, less than an hour, or even less than half an hour, for example, because the method as disclosed herein requires fewer samples of heart sound data or acceleration data to make such determination, as compared to other methods in the art, which may require at least an entire day's worth of data samples with which to perform calculations in order to make such determinations.

Various modifications and additions can be made to the exemplary embodiments discussed without departing from the scope of the disclosed subject matter. For example, while the embodiments described above refer to particular features, the scope of this disclosure also includes embodiments having different combinations of features and embodiments that do not include all of the described features. Accordingly, the scope of the disclosed subject matter is intended to embrace all such alternatives, modifications, and variations as fall within the scope of the claims, together with all equivalents thereof.

We claim:

1. A system comprising:
    a medical device comprising an acceleration sensor configured to generate acceleration data;
    a processor; and
    a memory containing computer-executable instructions that, when executed by the processor, cause the processor to:
        obtain the acceleration data from a first range of time and a second range of time different from the first range,
        generate heart sound data for the first range of time and the second range of time based on the acceleration data,
        generate a phonocardiogram based on the heart sound data,
        determine that the medical device has flipped in orientation during the second range of time by:
            comparing the heart sound data for the first range of time with the heart sound data for the second range of time, and
            identifying a change from the heart sound data for the first range of time to the second range of time based on analyzing the phonocardiogram,
            wherein the medical device is determined to have flipped between the first and second ranges of time when a directionality of the heart sound data is reversed from the first range of time to the second range of time and in response to determining that the medical device has flipped, control the medical device to at least one of perform a recalibration of the medical device, or switch between a low-power communication link and a high-power communication link.

2. The system of claim 1, wherein the heart sound data includes the acceleration data collected within a span of less than about 1 hour.

3. The system of claim 1, wherein;
    the computer-executable instructions include a heart sound generation algorithm;
    the heart sound data is generated based on the acceleration data using the heart sound generation algorithm, and
    the instructions are further configured to cause the processor to: update the heart sound generation algorithm in response to determining that the medical device has flipped.

4. The system of claim 1, wherein the instructions are configured to cause the processor to:
    perform the recalibration of the medical device in response to determining that the medical device has flipped.

5. The system of claim 1, wherein the instructions are further configured to cause the processor to:
    generate an alert notification to a user of the medical device in response to determining that the medical device has flipped.

6. The system of claim 1, wherein the comparison of the acceleration data comprises at least one of: phase comparison analysis, correlation analysis, fiducial comparison analysis, or pattern recognition analysis.

7. The system of claim 1, wherein the instructions are configured to cause the processor to:

switch between the low-power communication link and the high-power communication link for the medical device in response to determining that the medical device has flipped.

8. The system of claim 1, wherein the instructions are further configured to cause the processor to:
obtain additional data during the first range of time and the second range of time,
the additional data including at least one of: magnetometer measurement data, impedance measurement data, optical sensor measurement data, or temperature measurement sensor; and
confirm that the medical device has flipped by comparing the additional data obtained during the first range of time with the additional data obtained during the second range of time.

9. A processor-implemented method comprising:
obtaining acceleration data from an acceleration sensor during a first range of time and a second range of time different from the first range;
generating heart sound data for the first range of time and the second range of time based on the acceleration data;
generating a phonocardiogram based on the heart sound data;
determining that the medical device has flipped between the first and second ranges of time by:
comparing the heart sound data for the first range of time with the heart sound data for the second range of time, and
identifying a change from the heart sound data for the first range of time to the second range of time based on analyzing the phonocardiogram, wherein the medical device is determined to have flipped between the first and second ranges of time when a directionality of the heart sound data is reversed from the first range of time to the second range of time and in response to determining that the medical device has flipped, controlling the medical device to at least one of perform a recalibration of the medical device, or switching between a low-power communication link and a high-power communication link.

10. The method of claim 9, further comprising:
performing at least one of: phase comparison analysis, correlation analysis, fiducial comparison analysis, or pattern recognition analysis, to facilitate the comparison of the acceleration data.

11. The method of claim 9, further comprising:
obtaining additional data during the first range of time and the second range of time, the additional data including at least one of: impedance measurement data, optical sensor measurement data, or temperature measurement sensor; and
confirming that the medical device has flipped by comparing the additional data obtained during the first range of time with the additional data obtained during the second range of time.

12. One or more non-transitory computer-readable media having computer-executable instructions embodied thereon, the instructions configured to be executed by a processor to cause the processor to:
obtain acceleration data from an acceleration sensor of a medical device during a first range of time and a second range of time different from the first range;
generate heart sound data for the first range of time and the second range of time from the acceleration data;
generate a phonocardiogram based on the heart sound data; and
determine that the medical device has flipped between the first and second ranges of time by:
comparing the heart sound data for the first range of time with the heart sound data for the second range of time,
identifying a change from the heart sound data for the first range of time to the second range of time based on analyzing the phonocardiogram, wherein the medical device is determined to have flipped between the first and second ranges of time when a directionality of the heart sound data is reversed from the first range of time to the second range of time and in response to determining that the medical device has flipped, controlling the medical device to at least one of perform a recalibration of the medical device, or switching between a low-power communication link and a high-power communication link.

13. The media of claim 12, wherein the comparison of the acceleration data comprises at least one of: phase comparison analysis, correlation analysis, fiducial comparison analysis, or pattern recognition analysis.

14. The media of claim 12, wherein the instructions are further configured to cause the processor to:
obtain additional data during the first range of time and the second range of time, the additional data including at least one of: impedance measurement data, optical sensor measurement data, or temperature measurement sensor; and
confirm that the medical device has flipped by comparing the additional data obtained during the first range of time with the additional data obtained during the second range of time.

* * * * *